Dec. 18, 1962 W. N. POUNDSTONE ETAL 3,069,147
ROTARY CUTTING HEAD
Filed Oct. 19, 1959 2 Sheets-Sheet 1

INVENTORS
WILLIAM N. POUNDSTONE
GEORGE RAYNOVICH, JR.
BY Stanley J Price
their ATTORNEY

INVENTORS
WILLIAM N. POUNDSTONE
GEORGE RAYNOVICH, JR.

BY Stanley J Price their ATTORNEY

United States Patent Office 3,069,147
Patented Dec. 18, 1962

3,069,147
ROTARY CUTTING HEAD
William N. Poundstone, Morgantown, W. Va., and George Raynovich, Jr., Pittsburgh, Pa., assignors to Consolidation Coal Company, Pittsburgh, Pa., a corporation of Pennsylvania
Filed Oct. 19, 1959, Ser. No. 847,392
5 Claims. (Cl. 262—26)

This invention relates to a rotary cutting head adapted to be used with a continuous mining machine of the general type that cuts circular kerfs in a vertical face of a mine, and more particularly, to a rotary cutting head in which elements of the cutting head rotate at different angular velocities to improve the cutting action of the cutting head.

Among the many types of machines used to continuously remove coal or other minerals from a seam or, vein, there is a type of machine generally designated as the McKinley mining machine. This machine has a body mounted on endless type treads which permit the machine to tram or continuously advance into the seam as the mineral is removed. The body is so constructed that the dislodged mineral is conveyed toward the rear of the machine by means of a longitudinal central conveyor system. This machine has a pair of spaced rotatable drive shafts extending horizontally from the front end of the body and rotatable cutting heads secured to the front ends of each of the drive shafts. The rotatable cutting heads are adapted to rotate in a plane parallel to the vertical face of the mineral seam. The cutting heads have arms extending radially therefrom with a plurality of cutter bits secured normal to the arms at the radial end portions.

As the machine advances into the mineral seam, the bits attack the vertical face of mineral and cut annular kerfs therein. The present machines also have an axially positioned center cutter portion that penetrates the mineral face at the center of the annular kerfs and dislodges the center material.

One of the difficulties experienced with this type of machine is the tread slippage or loss of traction as the machine attempts to advance into the mineral seam. It has been determined that one of the principal reasons for this tread slippage is the inadequate operation of the center cutter portion of the rotary cutting head. The cutting elements on the center cutter portion, due to their axial position on the rotary cutting head, have a relatively small linear velocity in relation to the cutter bits extending normally from the ends of the arms. Since the center cutter portion and the radially extending arms are formed as a single rotating unit, their angular velocity is the same. Because of the difference in radii from the axis of rotation to the cutting elements of the center cutter portion and the cutter bits on the ends of the radial arms respectively, there is a great difference in the linear velocities of the respective cutting elements. Since the cutting elements operate more efficiently at higher linear velocities, it has been determined that the center cutter portion cannot advance into the mineral seam as quickly as can the cutter bits on the ends of the radial arms. Thus, in the conventional machines, equipped with the conventional unitary rotary cutting heads, the rate of displacement or removal of the mineral and therefore the rate of advance of the mining machine into the mineral seam, is dependent upon the rate at which the center cutter portion penetrates the mineral seam.

The present invention contemplates the provision of a rotary cutter head formed in two relatively rotatable parts so designed that the center cutter portion may rotate at higher angular velocities than the radially extending arm portions. With such a cutter head, the angular velocities of the center cutter portion and the radial arm portions may be selected for the most efficient advance of the cutter head into the mineral seam. Thus, the wide discrepancy in linear velocities of the cutting elements of the center cutter portion and the cutter bits on the radial arms may be adjusted for optimum cutting. In some instances, it may be desirable to have the linear velocity of the cutter elements of the center cutter portion slightly higher or slightly lower than the linear velocities of the cutting bits on the ends of the radial arms. However, in all instances, the center cutter portion of the rotary cutting head should rotate at a higher angular velocity than the radial arm portion of the rotary cutting head.

With the foregoing considerations in mind, it is a primary object of the present invention to provide an improved rotary cutting head.

It is another object of the present invention to provide a rotary cutting head in which the center cutter portion rotates at a higher angular velocity than the radial arm portion to which the circumferential cutting bits are attached.

It is a further object of the present invention to provide an improved continuous mining machine which employs a cutting bit having a center cutter portion which rotates at higher angular velocities than the radial arm portion.

It is still another object of the present invention to provide means by which either the center cutter portion or the radial arm portion of the rotating rotary cutting head may be directly driven by the mining machine drive means and in turn may drive the other cutting head rotating element.

These and other object of this invention will become apparent as this description proceeds in conjunction with the attached drawings.

Figure 1:
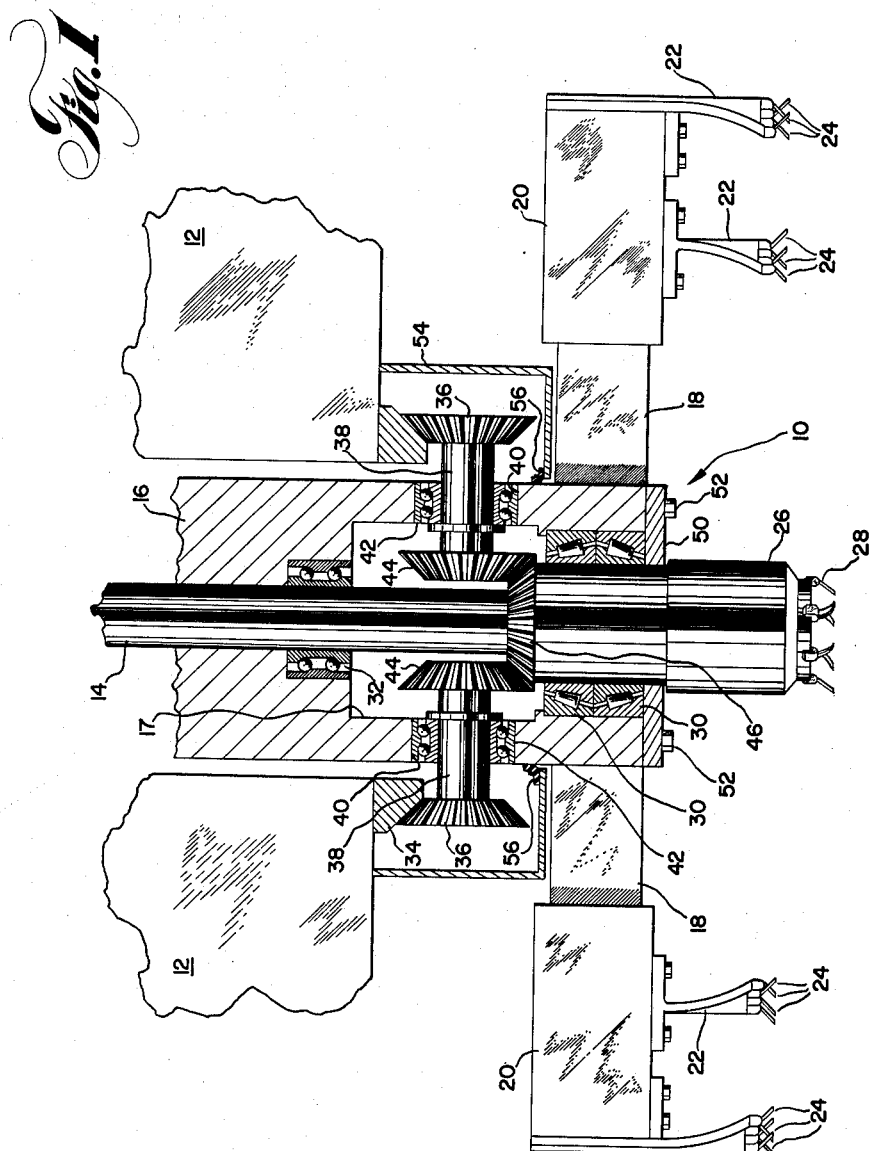
FIGURE 1 is an elevational view partially in section of the rotary cutting head of the present invention.

Referring now to the drawings, in which like reference numerals refer to similar parts in all figures, the present invention will be described in some detail. In FIGURE 1, the improved rotary cutting head is indicated generally by the numeral 10. The mining machine body 12 is supported on endless type treads (not shown) to continuously advance it into the seam of mineral as the mineral is removed. The body 12 advances into the mineral seam in a direction from top to bottom as viewed in FIGURE 1. A center cutter shaft 14 is rotatably supported by support means (not shown) within the machine body 12. The center cutter shaft 14 is driven by the machine drive means (not shown) mounted on the machine body 12.

A hollow shaft 16 having a cylindrical chamber 17 formed within the end thereof, rotatably surrounds shaft 14 and is coaxial therewith. The shaft 16 is rotatably supported within the machine body 12. A pair of arms 18 are secured to the shaft 16 at the end of shaft 16 and extend radially outwardly from shaft 16. Sleeve members 20 are positioned over the radial end portions of the arms 18 in a manner that the sleeves 20 are not rotatable about the longitudinal axis of the arms 18. However, the sleeve members 20 are slidably positioned on the arms 18 so that the radial dimension between the sleeve members 20 and the shaft 16 can be changed to either increase or decrease the overall diametrical dimension of the rotary cutting head 10.

A series of tool holders 22 are secured to the sleeve members 20. Tool holders 22 are formed as circular segments having their approximate centers at the axis of shaft 14. The tool holders 22 each have a plurality of cutter bits 24 secured to the forward portions thereof. When the shaft 16 and the radially extending arms 18 are rotated, the cutter bits 24 cut annular kerfs into the material being mined.

The center cutter shaft 14 has a center cutter body portion 26 rigidly secured to the forward end portion of shaft 14. The center cutter body portion 26 may be hollow, and has a plurality of cutter bits 28 secured to the forward rim of the cutter body portion. The exact construction of the center cutter body portion is not a critical element of the present invention and the center cutter body portion may be of any well-known form. In some instances, it may be desirable to utilize a center cutter means in the form of a boring auger to bore into the mineral seam at the center of the rotary cutting head. In the present invention, however, the center cutter is non-rotatably secured to center cutter shaft 14 irrespective of the specific form the center cutter means takes.

Bearings 30 and 32 are employed to rotatably secure shaft 16 about shaft 14. Shaft 16 may also be suitably supported in body 12 for rotation relative to body 12. A ring bevel gear 34 is fixed to machine body 12 in coaxial relation with shafts 14 and 16 and surrounding shafts 14 and 16. Two pinions 36 are non-rotatably secured to pinion shafts 38 and mesh with ring bevel gear 34. Radial bores 40 are formed in shaft 16 to receive bearings 42 which rotatably journal shafts 38 relative to shaft 16. The ends of shafts 38 pass into the cylindrical chamber 17 formed at the end of shaft 16. Within the chamber 17, pinions 44 are non-rotatably secured to the ends of pinion shafts 38. A bevel gear 46 is fixed to shaft 14 and is in meshing relation with pinions 44.

An annular cover member 50 is secured to the forward end of shaft 16 by bolts 52. A protective guard 54 having a cylindrical body portion and an annular forward face portion surrounds the bevel ring gear 34 and the pinions 36 to protect the gears from any damage that might be caused by dirt or foreign particles entering between the gear teeth. The protective cover 54 has an annular seal element 56 secured to the interior thereof which forms a running seal with the cylindrical surface of shaft 16.

With the foregoing arrangement of elements in mind, the operation of the improved rotary cutter head 10 will be readily apparent. The center cutter shaft 14 is driven at a relatively high angular velocity by the mining machine driving means (not shown). The cutter bits 28 which are secured to the center cutter body portion 26 that is in turn fixed to the shaft 14 have a relatively high linear velocity due to the high angular velocity of shaft 14. The bevel gear 46 which is fixed to the shaft 14 meshes with pinions 44 and drives them. Pinions 44, being non-rotatably secured to shafts 38 as are pinions 36, drive pinions 36. Pinions 36 mesh with the large bevel ring gear 34 that is non-rotatably secured to the body 12 of the mining machine. Since bevel ring gear 34 is fixed to the machine body 12, rotation of pinions 44 and 36 causes the shaft 16 to rotate, shafts 38 being journalled for rotation relative to shaft 16. The sizes of bevel gear 46, pinions 44, pinions 36, and ring bevel gear 34, are proportioned such that shaft 16 is driven at a substantially lower angular velocity than shaft 14. Since the angular velocity of shaft 16 is lower than that of shaft 14, the linear velocity of the cutter bits 24 on the ends of the radial arms 18 will not be substantially greater than the linear velocity of the cutter bits 28 on the center cutter portion 26 as would be the case if the center cutter portion and the radial arms rotated at the same angular velocity.

Figure 2:
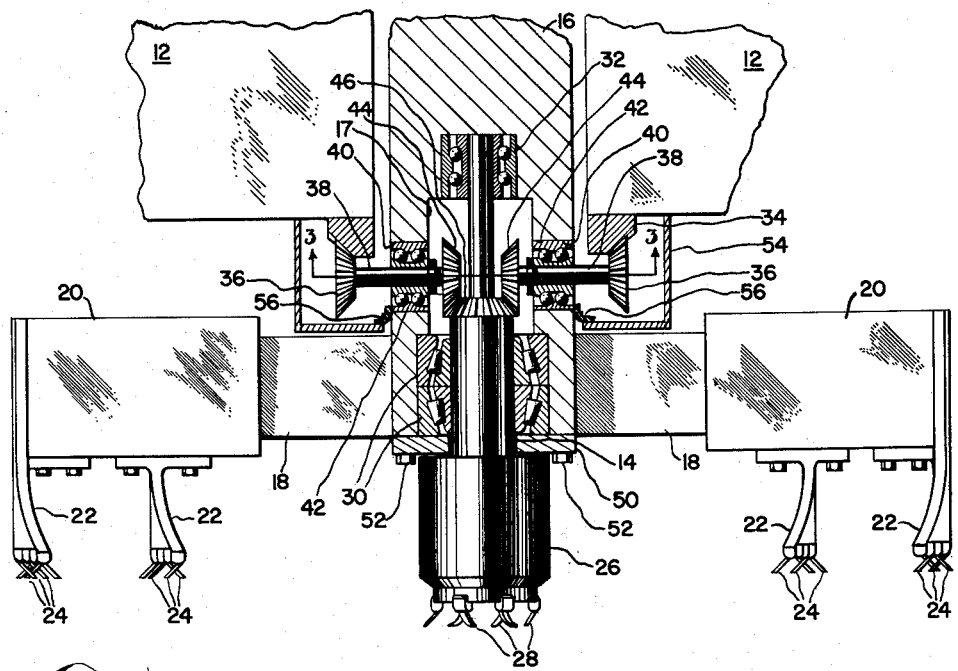
FIGURE 2 is an elevation, partially in section, similar to FIGURE 1, of another embodiment of the present invention.
Figure 3:
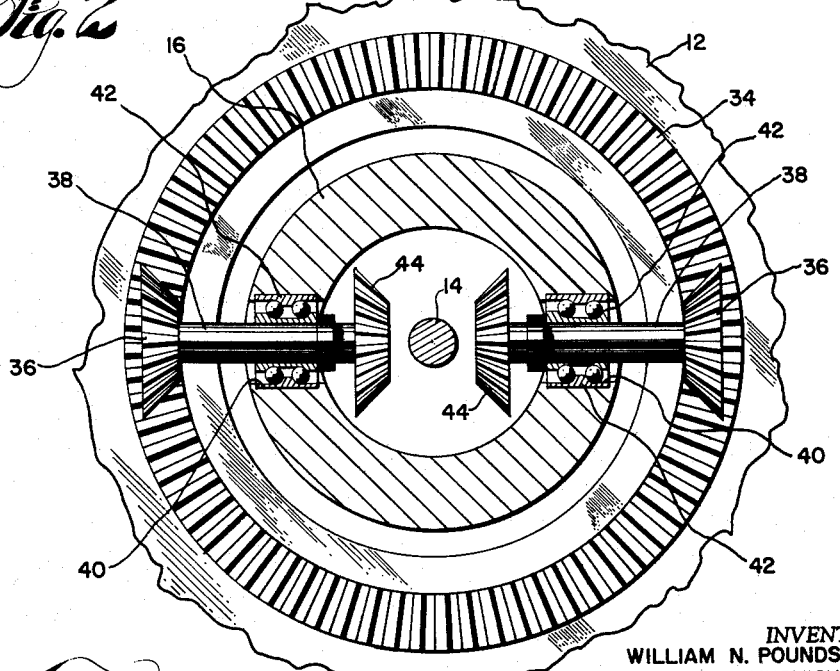
FIGURE 3 is a partial section taken along line 3—3 of FIGURE 2 showing certain details of the gear drive train that are common to the embodiments of FIGURES 1 and 2.

Referring now to FIGURES 2 and 3, there is shown a slightly altered embodiment of the present invention. In some applications of the present invention, it may be desirable to drive the radial arms 18 of the cutter head directly from the mining machine drive means. In that case, the center cutter portion of the rotary cutting head will be driven at a higher angular velocity than the radial arm portion through the radial arm portion. FIGURE 2 shows an embodiment of the invention which is particularly adapted for driving the radial arm portion of the cutter head directly from the mining machine drive means.

The embodiment of FIGURE 2 is generally similar to that of FIGURE 1 and the reference numbers utilized in describing the embodiment of FIGURE 1 have been applied to FIGURE 2. It is deemed unnecessary to repeat the detailed description of the elements of the rotary head of FIGURE 2, and the embodiment of FIGURE 2 will be described only insofar as it differs from the embodiment described in connection with FIGURE 1. In FIGURE 2, the shaft 16 is not hollow throughout its length as in FIGURE 1. Rather, the shaft 16 has only the cylindrical chamber 17 formed in the end thereof. The center cutter shaft 14 of FIGURE 2 terminates at bearings 32 and is, in effect, an auxiliary shaft journalled for rotation within the end portion of shaft 16. In the embodiment of FIGURE 2, the shaft 16 is driven by the mining machine drive means (not shown) at some given angular velocity. The rotary cutting head of FIGURE 2 then functions as follows.

When shaft 16 is rotating at the given angular velocity, the shafts 38 are carried along with shaft 16. The pinions 36, meshing with the fixed ring bevel gear 34, cause shafts 38, to which pinions 36 are non-rotatably secured, to rotate about their own axes. The rotation of shafts 38 drives pinions 44 which are non-rotatably fixed to shafts 38. Pinions 44, in meshing relation with the bevel gear 46 fixed to the shaft 14, drive the shaft 14 at an angular velocity higher than the angular velocity of the shaft 16. Slight variations in the sizes of the bevel ring gear 34, the pinions 36 and 44, and the bevel gear 46 in both embodiments may be made to adjust the angular velocities of shaft 16 and shaft 14 to produce optimum cutting by the rotary cutting head.

The form of the invention described in detail is a cutterhead for the type of mining machine designated a McKinley mining machine. It will be appreciated, however, that in its broad aspects the invention is applicable to any rotary cutterhead that has a substantial diameter. Thus, many types of mining augers have a large diameter rotary cutting head which may be formed in two relatively rotatable parts as taught by the instant invention so that the center cutter portion may rotate at a higher angular velocity than the circumferential cutter portion.

According to the provisions of the patent statutes, we have explained the principle, preferred construction and mode of operation of our invention and have illustrated and described what we now consider to represent its best embodiments. However, we desire to have it understood that, within the scope of the appended claims, the invention may be practiced otherwise than as specifically illustrated and described.

We claim:

1. A rotary cutting head mounted for rotation on a mining machine body and adapted to cut into a face of material comprising in combination a first rotatable shaft supported by said mining machine body, a second rotatable shaft having a forwardly extending end portion journalled for rotation relative to said first shaft coaxially with said first shaft, cutting means rigidly connected to said first shaft in radially spaced relation to said first shaft and operable upon rotation of said first shaft to cut an annular kerf in said material, center cutter means fixed to said second shaft end portion and operable to cut away said material adjacent the center of said annular kerf upon rotation of said second shaft, first gear means fixed to said mining machine body coaxially with said first and second shafts, second gear means fixed to said second shaft, and pinion means rotatably supported by said first shaft and meshing with said first and second gear means, said first and second gear means and said pinion means so constructed and arranged that said first shaft rotates at a lesser angular velocity than said second shaft upon rotation of said shafts.

2. A mining machine adapted to cut a substantially vertical face of material comprising in combination a machine body, a first shaft rotatably mounted on said machine body and extending forwardly therefrom, a second shaft having a forwardly extending end portion journalled for rotation relative to said first shaft coaxially with said first shaft, an arm fixed to and extending radially from said first shaft, cutting means carried by said arm in spaced relation to said first shaft and operable upon rotation of said first shaft to cut an annular kerf in said material, center cutter means fixed to said second shaft end portion and operable to cut away said material adjacent the center of said annular kerf upon rotation of said second shaft, first gear means fixed to said mining machine body coaxially with said first and second shafts, second gear means fixed to said second shaft, and pinion means rotatably supported by said first shaft and meshing with said first and second gear means, said first and second gear means and said pinion means so constructed and arranged that said second shaft rotates at a greater angular velocity than said first shaft upon rotation of said shafts.

3. A mining machine adapted to cut a substantially vertical face of material comprising in combination a machine body, a first shaft having a hollow cylindrical chamber formed therein rotatably mounted on said machine body and extending forwardly therefrom, a second shaft having a forwardly extending end portion journalled for rotation relative to said first shaft coaxially with said first shaft within said first shaft hollow chamber and driven by driving means carried by said machine body, an arm fixed to and extending radially from said first shaft, cutting means carried by said arm in spaced relation to said first shaft and opeable upon rotation of said first shaft to cut an annular kerf in said material, center cutter means fixed to said second shaft end portion and operable to cut away said material adjacent the center of said annular kerf upon rotation of said second shaft, a ring bevel gear secured to said machine body coaxially with said first and second shafts and surrounding said first shaft, a plurality of first bevel pinions meshing with said ring bevel gear, a like plurality of pinion shafts radially extending into said first shaft hollow chamber and journalled for rotation relative to said first shaft, each of said first pinions non-rotatably secured to one of said pinion shafts externally of said first shaft, a like plurality of second pinions non-rotatably secured one each to said pinion shafts within said first shaft hollow chamber, a bevel gear fixed to said second shaft meshing with said second pinions, said bevel gear, said second pinions, said first pinions, and said ring bevel gear so constructed and arranged that said first shaft is driven at a lesser angular velocity than said second shaft by power transmitted from said second shaft to said first shaft.

4. A mining machine adapted to cut a substantially vertical face of material comprising in combination a machine body, a first shaft having a hollow cylindrical chamber formed therein rotatably mounted on said machine body and extending forwardly therefrom driven by driving means carried by said machine body, a second shaft having a forwardly extending end portion journalled for rotation relative to said first shaft coaxially with said first shaft within said first shaft hollow chamber, an arm fixed to and extending radially from said first shaft, cutting means carried by said arm in spaced relation to said first shaft and operable upon rotation of said first shaft to cut an annular kerf in said material, center cutter means fixed to said second shaft end portion and operable to cut away said material adjacent the center of said annular kerf upon rotation of said second shaft, a ring bevel gear secured to said machine body coaxially with said first and second shafts and surrounding said first shaft, a plurality of first bevel pinions meshing with said ring bevel gear, a like plurality of pinion shafts radially extending into said first shaft hollow chamber and journalled for rotation relative to said first shaft, each of said first pinions non-rotatably secured to one of said pinion shafts externally of said first shaft, a like plurality of second pinions non-rotatably secured one each to said pinion shafts within said first shaft hollow chamber, a bevel gear fixed to said second shaft meshing with said second pinions, said ring bevel gear, said first pinions, said second pinions and said bevel gear so constructed and arranged that said second shaft is driven at a greater angular velocity than said first shaft by power transmitted from said first shaft to said second shaft.

5. A mining machine adapted to cut a substantially vertical face of material comprising in combination a machine body, a first shaft having a hollow cylindrical chamber formed therein rotatably mounted on said machine body and extending forwardly therefrom, a second shaft having a forwardly extending end portion journalled for rotation relative to said first shaft coaxially with said first shaft within said first shaft hollow chamber, an arm fixed to and extending radially from said first shaft, cutting means carried by said arm in spaced relation to said first shaft and operable upon rotation of said first shaft to cut an annular kerf in said material, center cutter means fixed to said second shaft end portion and operable to cut away said material adjacent the center of said annular kerf upon rotation of said second shaft, a ring bevel gear secured to said machine body coaxially with said first and second shafts and surrounding said first shaft, a plurality of first bevel pinions meshing with said ring bevel gear, a like plurality of pinion shafts radially extending into said first shaft hollow chamber and journalled for rotation relative to said first shaft, each of said first pinions non-rotatably secured to one of said pinion shafts externally of said first shaft, a like plurality of second pinions non-rotatably secured one each to said pinion shafts within said first shaft hollow chamber, a bevel gear fixed to said second shaft meshing with said second pinions, said bevel gear, said second pinions, said first pinions, and said ring bevel gear so constructed and arranged that said first shaft rotates at a lesser angular velocity than said second shaft upon operation of said mining machine.

References Cited in the file of this patent

UNITED STATES PATENTS

| | | |
|---|---|---|
| 307,379 | Craven | Oct. 28, 1884 |
| 1,674,870 | Morgan | June 26, 1928 |
| 2,250,670 | Joy | July 29, 1941 |